United States Patent
Aoki et al.

(10) Patent No.: US 6,712,048 B2
(45) Date of Patent: Mar. 30, 2004

(54) DRIVING CIRCUITRY FOR ELECTROMAGNETIC FUEL INJECTION VALVE

(75) Inventors: Tsuneaki Aoki, Obu (JP); Atsushi Okada, Obu (JP); Kazuhiro Yoneshige, Obu (JP)

(73) Assignee: Aisan Kogyo Kabushiki Kaisha, Aichi (JP)

(*) Notice: Subject to any disclaimer, the term of this patent is extended or adjusted under 35 U.S.C. 154(b) by 33 days.

(21) Appl. No.: 10/152,131

(22) Filed: May 21, 2002

(65) Prior Publication Data

US 2002/0179059 A1 Dec. 5, 2002

(30) Foreign Application Priority Data

May 31, 2001 (JP) ........................................ 2001-163948

(51) Int. Cl.[7] ......................... F02M 51/00; H01H 47/04
(52) U.S. Cl. ....................................... 123/490; 361/154
(58) Field of Search .......................... 123/490; 361/154

(56) References Cited

U.S. PATENT DOCUMENTS 6,234,150 B1 * 5/2001 Watanabe .................... 123/490
6,532,940 B1 * 3/2003 Ono et al. ................... 123/490

FOREIGN PATENT DOCUMENTS

JP  11351039 A  12/1999

* cited by examiner

*Primary Examiner*—Tony M. Argenbright
(74) *Attorney, Agent, or Firm*—Baker Botts LLP

(57) ABSTRACT

Driving circuitry for an electromagnetic fuel injection valve in which the holding current value is made variable to obtain a minimum necessary holding force from the holding current according to the fuel pressure includes a solenoid for driving the fuel injection valve, a capacitor charged by a high-voltage charge control part, a switch circuit for on-off controlling a high-voltage current supplied from the capacitor to the solenoid in response to an injection command signal, and a holding current supply circuit for supplying a holding current from the power supply to the solenoid. When the holding current is supplied, a comparator circuit compares a voltage obtained by converting the value of electric current flowing through the solenoid by a resistor for detection and a voltage corresponding to a fuel pressure sensor signal, and the value of the holding current is varied according to an output signal from the comparator circuit.

2 Claims, 4 Drawing Sheets

DRIVING CIRCUITRY FOR ELECTROMAGNETIC FUEL INJECTION VALVE

BACKGROUND OF THE INVENTION

1. Field of the Invention

The present invention relates to driving circuitry for an electromagnetic fuel injection valve for use in a direct-injection gasoline engine in which fuel is injected directly into the engine cylinder.

2. Discussion of Related Art

For the purpose of improving the combustion efficiency of a gasoline engine, it has been attempted to inject fuel directly into the engine cylinder from an injector (electromagnetic fuel injection valve) provided for the cylinder. The direct injection of fuel into the cylinder allows all the gasoline fuel injected from the injector to be supplied into the cylinder and hence makes it possible to realize combustion closer to the stoichiometric one. Accordingly, it is possible to enhance fuel economy and to reduce $NO_x$, HC and so forth in exhaust gas.

In the case of the direct injection, where the gasoline fuel is injected is a space formed by the cylinder block, the piston and the cylinder head. Considering the fuel injection performed during compression stroke, the fuel has to be injected under a very high pressure in comparison to port injection in which fuel is injected into the intake manifold. Further, there is no sufficient space and time to allow the injected fuel to diffuse satisfactorily. Accordingly, in order to obtain combustion conditions comparable to those of the port injection engine under the above-described conditions, it is necessary to increase the pressure of gasoline fuel supplied to the injector so that the fuel is satisfactorily diffused from the moment it is injected into the cylinder.

An injector driving circuit 1 for a direct-injection gasoline engine as shown in FIG. 3 has heretofore been known [see Japanese Patent Application Unexamined Publication (KOKAI) No. Hei 11-351039]. The injector driving circuit 1 excites a solenoid L of an injector (INJ) of an engine to drive the injector. The solenoid L excited by the injector driving circuit 1 is contained in the injector (electromagnetic fuel injection valve). Although detailed illustration of the arrangement of the injector is omitted in the figure, the injector has a plunger slidable inside the solenoid L, a needle valve secured to the plunger, and a spring for urging the needle valve in the direction in which it is closed.

The injector driving circuit 1 in FIG. 3 includes a high-voltage application part 2, a timing control part (TC) 3, a constant-current control part 4, switches SW1 to SW3, and so forth. The high-voltage application part 2 comprises a high-voltage charge control part (HVC) 20 and a capacitor C for charging. The high-voltage charge control part 20 is connected between a battery B (power supply) and the capacitor C to convert the battery voltage (+B, e.g. 12 V) to a high voltage of the order of 200 V and to control charging of the capacitor C. The timing control part 3 on-off controls the switches SW1 to SW3 individually at predetermined timing on the basis of an injection command signal output from an engine control unit (ECU; not shown). It should be noted that the ECU judges the operating condition of the engine on the basis of detection signals input thereto from various sensors and outputs an injection command signal and so forth to each control part of the engine according to the judged operating condition.

The constant-current control part 4 comprises a comparator circuit 41, resistors 42 and 43, and reference voltage generating resistors 44 and 45. The non-inverting input terminal of the comparator circuit 41 is supplied with a reference voltage obtained from the reference voltage generating resistors 44 and 45. The inverting input terminal of the comparator circuit 41 is supplied with a detected value (voltage) from a resistor R4 for detection. The switch SW3 is on-off controlled by a signal from the timing control part 3 or an output signal from the comparator circuit 41. On the basis of a control signal from the timing control part 3, or when the injector current is not in excess of a predetermined value, the switch SW3 is turned on to apply the battery voltage (+B) to the injector solenoid L (including an internal resistor R1). The electric current produced by the battery voltage is supplied to the injector solenoid L through a holding current supply circuit 7. It should be noted that reference symbol D1 denotes a diode for preventing backward flow of the electric current produced by the applied voltage.

Control signals transmitted from the timing control part 3 through resistors R2, R3 and resistors 43 and 42 are input to the switch control parts of the switches SW1 to SW3, and thus the switches SW1 to SW3 are on-off controlled, respectively. The switch SW1 controls the application of the high voltage to the injector solenoid L. The high-voltage current is supplied to the injector solenoid L through a switch circuit 6. The switch SW2 controls the electric current supplied to the injector solenoid L. That is, the drive of the injector INJ is controlled through the switch SW2. A Zener diode ZD1 and a diode D3 form an arc-suppression circuit.

The operation of the injector driving circuit 1 shown in FIG. 3 will be described below with reference to the timing chart of FIG. 4. Let us assume that the capacitor C has been charged by the high-voltage charge control part 20, and the solenoid applied voltage $V_d$ is high $V_c$ as shown in (f) of FIG. 4. In response to an injection command signal, the timing control part 3 operates to turn on the switches SW1 to SW3 simultaneously at time t1, as shown in (b) to (d) of FIG. 4.

As the switch SW1 turns on, the high voltage stored in the capacitor C is applied to the injector solenoid L. An injector solenoid excitation current (hereinafter referred to as "excitation current") $I_{SOL}$ flows through the injector solenoid L in the mode as shown in (e) of FIG. 4. Consequently, the needle valve begins to open. At time t2 when the excitation current value exceeds a preset current (large current) value $I_{th}$ for fully opening the needle valve of the injector, the switch SW1 turns off to terminate the application of the high voltage to the injector solenoid L.

Because the switch SW3 is turned on at time t1, the battery voltage (+B) is applied to the injector solenoid L during the period between time t2 and time t3 at which the switch SW3 is turned off. Regarding the application of the battery voltage (+B), the on-state of the switch SW3 is continued for the period τ2 between time t1 and time t3, as shown in (d) of FIG. 4. The needle valve is held in a substantially full open position during the period between time t2 and time t3.

As shown in (f) of FIG. 4, the solenoid applied voltage $V_d$ is a rectangular wave-shaped high voltage during the period between time t1 and time t2 at which the switch SW1 is turned off, i.e. during the period t1 shown in (b) of FIG. 4. It should be noted that the voltage waveform shown in (f) of FIG. 4 does not show the terminal voltage of the injector solenoid L but the voltage applied to the solenoid L, i.e. the waveform of the composite voltage on the voltage application side. The period τ1 is set as a period of time (constant value) sufficient to fully open the needle valve with reliability.

At time t3, the switch SW3 is turned off to terminate the application of the battery voltage (+B) to the solenoid L. During the period τ3 between time t3 and time t4 at which the injection command signal is switched off, the switch SW3 is of-off controlled at predetermined intervals to apply a pulsed battery voltage (+B) to the solenoid L. That is, as shown in (e) of FIG. 4, a constant excitation current $I_{SOL}$ (holding current) smaller than the preset current value $I_{th}$ flows through the solenoid L to hold the fully opened needle valve in a substantially full open position.

At time t4 when the fuel injection signal is switched off, the switches SW2 and SW3 are turned off to stop the supply of the holding current (valve "open" position holding current). Thereupon, the needle valve is closed rapidly, and the injection of fuel from the injector is also stopped. The described operation is repeatedly executed by the action of the injector driving circuit 1 shown in FIG. 3. Thus, each injector solenoid L of the engine is successively supplied with the excitation current $I_{SOL}$ in the mode as shown in (e) of FIG. 4.

As has been stated above, the pressure of fuel supplied to a direct-injection gasoline engine is set higher than the fuel pressure in a port injection engine. In the conventional direct-injection gasoline engine, the holding current (excitation current $I_{SOL}$ between time t3 and t4) value of the injector is set so as to be a rather large constant current independently of the magnitude of fuel pressure. Under these circumstances, the prior art suffers from the following problem. In a small injection quantity region, the fuel pressure is low, and hence the valve-closing force is small. Therefore, when the switch SW3 is turned off to make the excitation current $I_{SOL}$ zero at time t4 under such engine operating conditions, the needle valve cannot rapidly be closed because there is surplus holding force produced by the holding current, which has been set rather large. That is, an extra time is required to make the excitation current $I_{SOL}$ zero. Consequently, the time needed to close the needle valve of the injector lengthens undesirably. This is a cause of degrading the fuel injection characteristics of the injector.

SUMMARY OF THE INVENTION

An object of the present invention is to provide driving circuitry for an electromagnetic fuel injection valve in which the holding current value is made variable to obtain a minimum necessary holding force from the holding current according to the fuel pressure.

The present invention is applied to driving circuitry for an electromagnetic fuel injection valve that has an injector solenoid for driving the electromagnetic fuel injection valve, a capacitor charged by a high-voltage charge control part connected to a power supply, a switch circuit for on-off controlling a high-voltage current supplied from the capacitor to the injector solenoid in response to an injection command signal, and a holding current supply circuit for supplying a holding current from the power supply to the injector solenoid.

According to the present invention, when the holding current is supplied, a comparator circuit compares a voltage obtained by converting the value of electric current flowing through the injector solenoid by a resistor for detection and a voltage corresponding to a fuel pressure sensor signal, and the value of the holding current is varied according to an output signal from the comparator circuit.

The driving circuitry according to the present invention may be arranged as follows. The voltage obtained by converting the value of electric current flowing through the injector solenoid by the resistor for detection is input to an inverting input terminal of the comparator circuit, and the fuel pressure sensor signal is input to a non-inverting input terminal of the comparator circuit after being amplified in a constant-current control part. The output signal from the comparator circuit is input to a switch control part for a switch in the holding current supply circuit.

With the driving circuitry for an electromagnetic fuel injection valve according to the present invention, when the holding current is supplied, the comparator circuit compares a voltage obtained by converting the value of electric current flowing through the injector solenoid by a resistor for detection and a voltage corresponding to a fuel pressure sensor signal, and the value of the holding current is varied according to an output signal from the comparator circuit. Therefore, the holding current is variable according to the fuel pressure. Thus, it is possible to obtain a minimum necessary holding force according to the fuel pressure. Consequently, the time needed to close the needle valve of the injector shortens, and favorable fuel injection characteristics of the injector can be obtained.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
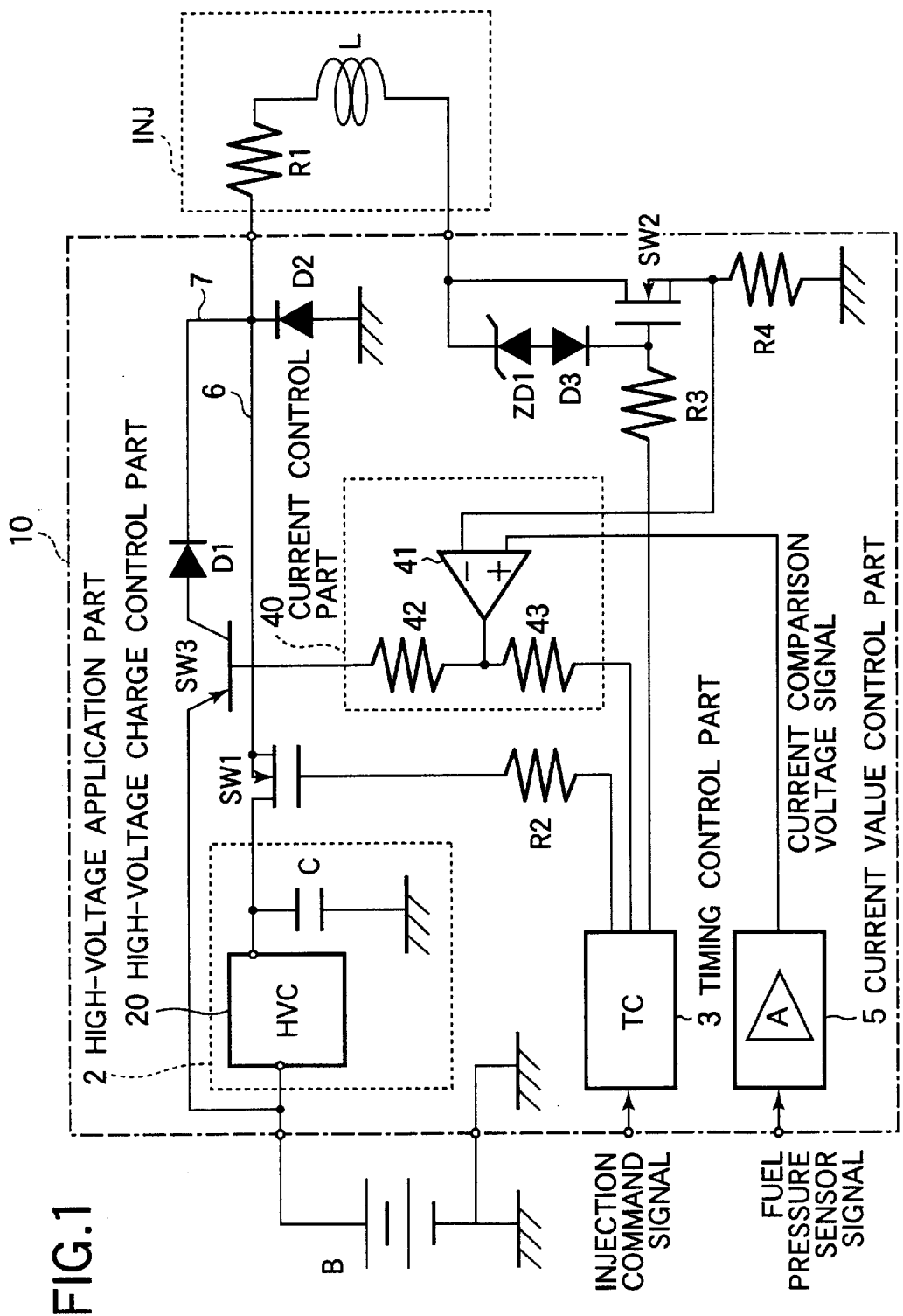
FIG. 1 is a circuit diagram showing an embodiment of the driving circuitry for an electromagnetic fuel injection valve according to the present invention.
Figure 2:
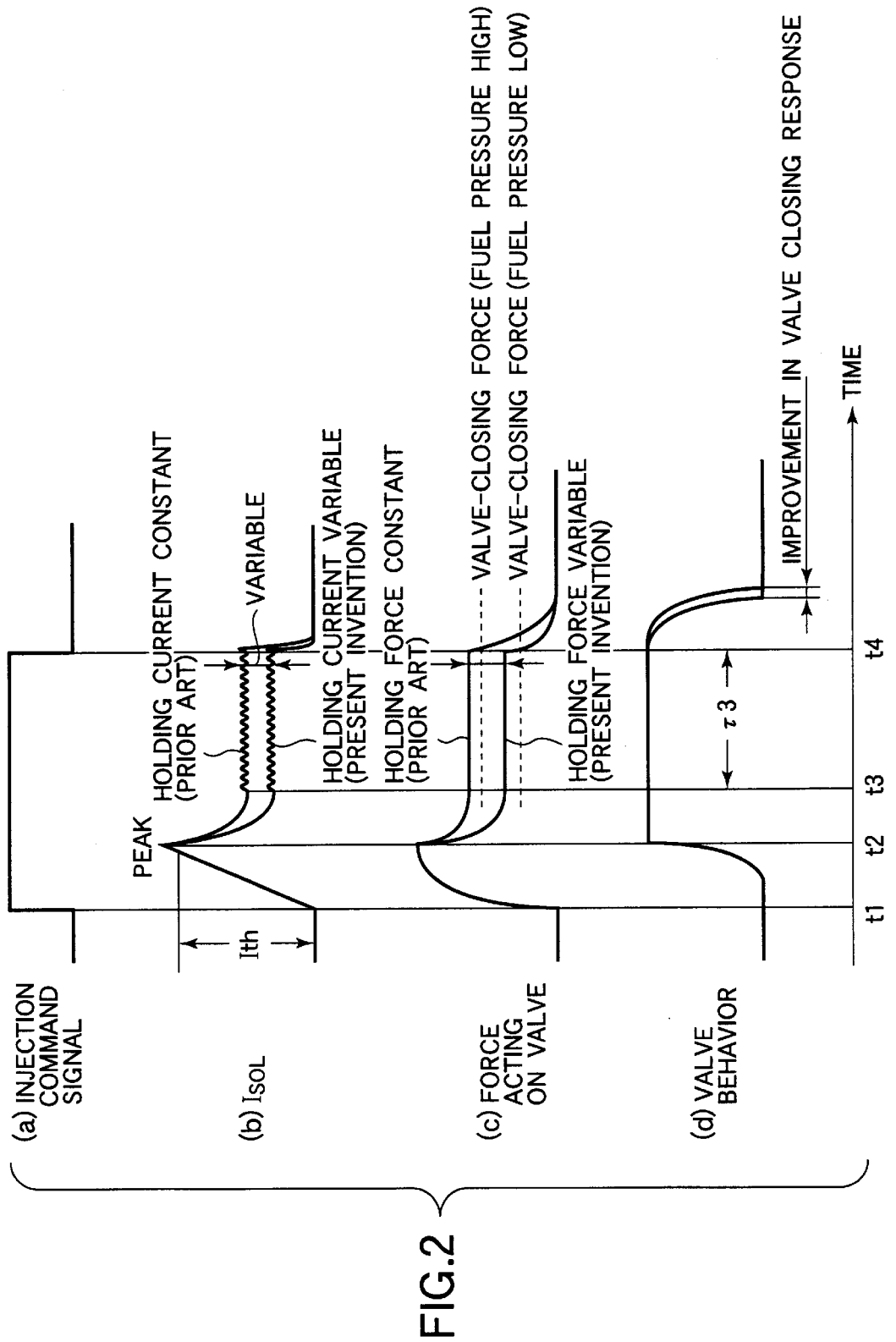
FIG. 2 is a timing chart showing a characteristic part of the operation of the embodiment of the driving circuitry for an electromagnetic fuel injection valve according to the present invention.
Figure 3:
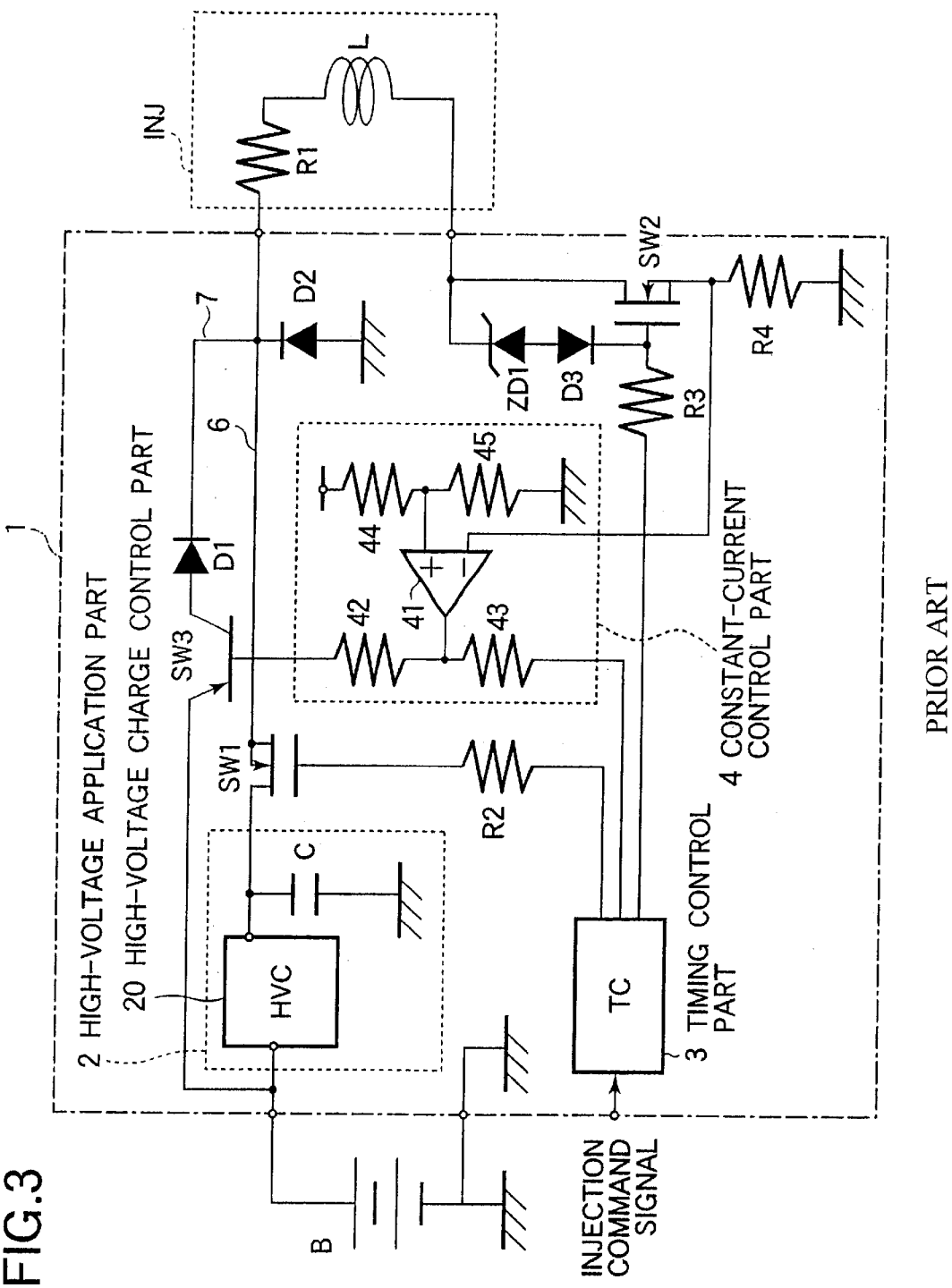
FIG. 3 is a circuit diagram showing conventional driving circuitry for an electromagnetic fuel injection valve.

FIGS. 1 and 2 show an embodiment of the driving circuitry for an electromagnetic fuel injection valve according to the present invention. In the injector driving circuit 1 shown in FIG. 3, the reference voltage between the resistors 44 and 45 is input to the non-inverting input terminal of the comparator circuit 41, whereas, in an injector driving circuit 10 according to the present invention, which is shown in FIG. 1, a voltage corresponding to a fuel pressure sensor signal is input to the non-inverting input terminal of the comparator circuit 41.

As shown in FIG. 1, a current control part 40 of the injector driving circuit 10 comprises resistors 42 and 43 and a comparator circuit 41. The injector driving circuit 10 is provided with a current value control part 5 having an amplifying function. A fuel pressure sensor signal is input to the current value control part 5, and a current comparison voltage signal (output signal from the current value control part 5) amplified according to the fuel pressure sensor signal is input to the non-inverting input terminal of the comparator circuit 41. The inverting input terminal of the comparator circuit 41 is supplied with a detected value from a resistor R4 for detection in the same way as in the conventional system. The arrangement of the rest of the system shown in FIG. 1 is similar to that in FIG. 3. Therefore, the same constituent members are denoted by the same reference symbols, and a description thereof is omitted.

Figure 4:
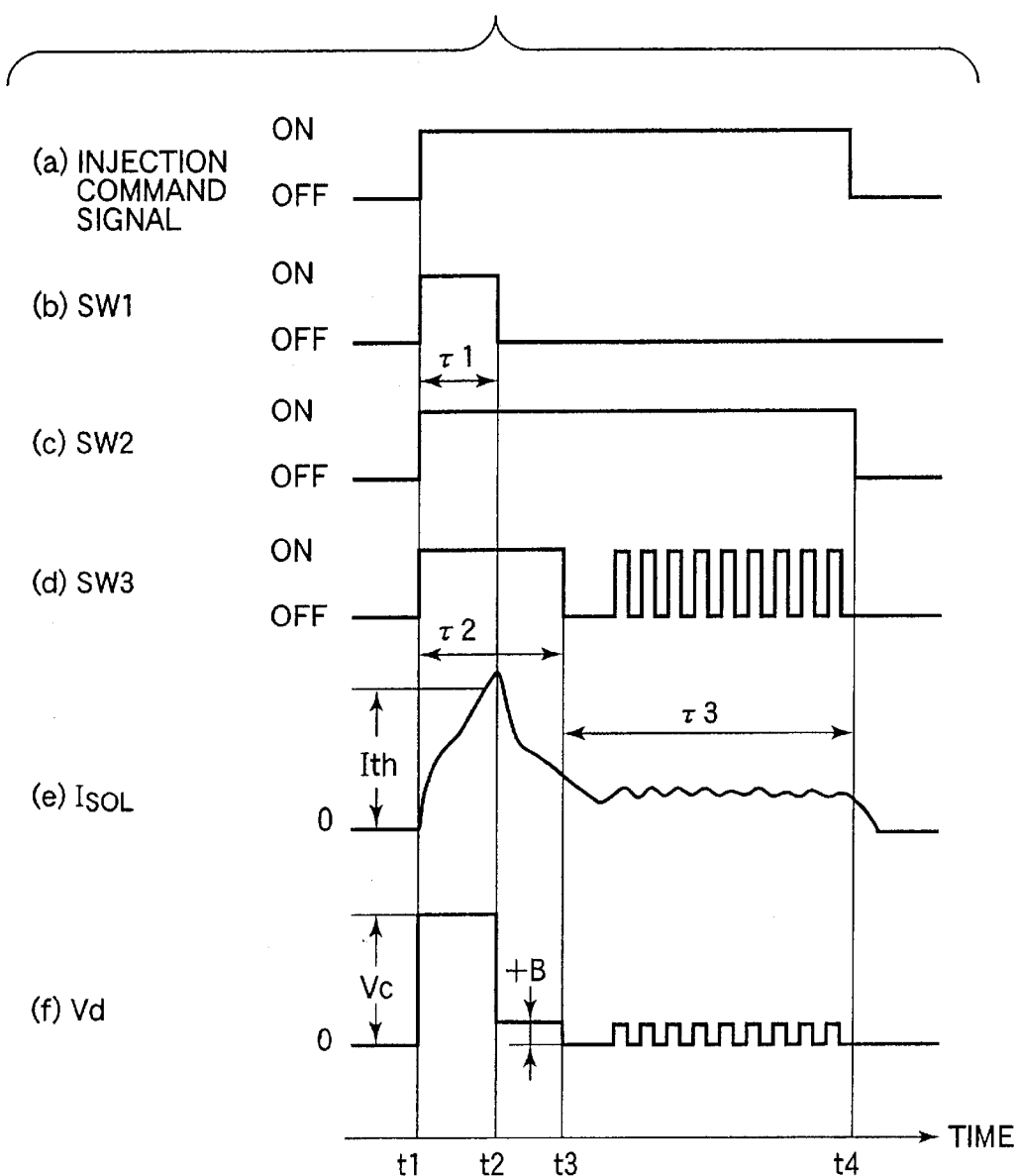
FIG. 4 is a timing chart showing the operation of the conventional driving circuitry for an electromagnetic fuel injection valve.

The operation of the injector driving circuit 10 shown in FIG. 1 is the same as that of the conventional system (i.e. the contents shown in the timing chart of FIG. 4) from the instant a high charge voltage is applied to the injector solenoid L upon turning on the switch SW1 until the switch SW3 turns off to terminate the application of the battery voltage (i.e. from time t1 to time t3). Therefore, a description thereof is omitted. The operation (driving current, force acting on the valve, and valve behavior) of the injector driving circuit 10 on and after time t3 is as shown in the timing chart of FIG. 2.

At time t3, the switch SW3 turns off to terminate the application of the battery voltage (+B) to the solenoid L. Thereafter, the comparator circuit 41 compares an input value obtained by converting the value of electric current flowing through the injector solenoid L by the resistor R4 for detection and an input value of current comparison voltage corresponding to the fuel pressure sensor signal, which is output from the current value control part 5. Thus, the comparator circuit 41 outputs a voltage according to the fuel pressure.

During the period τ3 between time t3 and time t4 at which the injection command signal is switched off, as shown in (b) of FIG. 2, a variable excitation current $I_{SOL}$ (holding current) smaller than the preset current value $I_{th}$ flows through the injector solenoid L to hold the fully opened needle valve in a substantially full open position. As shown in (b) and (c) of FIG. 2, when the fuel pressure is high, the current comparison voltage input to the comparator circuit 41 is high. Consequently, the holding current increases. Hence, holding force acting on the valve increases. Conversely, when the fuel pressure is low, the current comparison voltage input to the comparator circuit 41 is low. Consequently, the holding current decreases. Hence, holding force acting on the valve decreases. Thus, the holding current is variable according to the fuel pressure. Therefore, it is possible to obtain a minimum necessary holding force according to the fuel pressure.

Thus, the injector driving circuit 10 operates as follows. When the fuel pressure is low and hence the valve-closing force of the fuel pressure is small, the holding current decreases, and the valve "open" position holding force decreases. Accordingly, at time t4 when the injection command signal and the switch SW3 are turned off, the excitation current (holding current) $I_{SOL}$ becomes zero rapidly. Thus, the time needed to close the needle valve of the injector is favorably short.

It should be noted that the present invention is not necessarily limited to the foregoing embodiment but can be modified in a variety of ways without departing from the gist of the present invention.

What is claimed is:

1. Driving circuitry for an electromagnetic fuel injection valve, comprising:
    an injector solenoid for driving said electromagnetic fuel injection valve;
    a capacitor charged by a high-voltage charge control part connected to a power supply;
    a switch circuit for on-off controlling a high-voltage current supplied from said capacitor to said injector solenoid in response to an injection command signal; and
    a holding current supply circuit for supplying a holding current from said power supply to said injector solenoid;
    wherein when the holding current is supplied, a comparator circuit compares a voltage obtained by converting a value of electric current flowing through said injector solenoid by a resistor for detection and a voltage corresponding to a fuel pressure sensor signal, and a value of the holding current is varied according to an output signal from said comparator circuit.

2. Driving circuitry according to claim 1, wherein the voltage obtained by converting the value of electric current flowing through said injector solenoid by the resistor for detection is input to an inverting input terminal of said comparator circuit, and the fuel pressure sensor signal is input to a non-inverting input terminal of said comparator circuit after being amplified in a constant-current control part, and further the output signal from said comparator circuit is input to a switch control part for a switch in said holding current supply circuit.

* * * * *